United States Patent Office 3,560,608
Patented Feb. 2, 1971

3,560,608
ORAL COMPOSITIONS FOR CARIES AND CALCULUS PROPHYLAXIS
William J. Griebstein, Mount Healthy, Robert J. Grabenstetter, Colerain Township, Hamilton County, and James S. Widder, Springfield Township, Hamilton County, Ohio, assignors to The Procter & Gamble Company, Cincinnati, Ohio, a corporation of Ohio
No Drawing. Continuation-in-part of application Ser. No. 805,853, Mar. 10, 1969, which is a continuation-in-part of application Ser. No. 605,614, Dec. 29, 1966. This application Mar. 17, 1969, Ser. No. 807,974
Int. Cl. A61r 7/16
U.S. Cl. 424—49       3 Claims

ABSTRACT OF THE DISCLOSURE

Oral compositions containing stannous salts of certain polyphosphonic acids as a source of stable and dental enamel reactive stannous tin and as anticalculus agents.

CROSS-REFERENCE TO RELATED APPLICATIONS

This application is a continuation-in-part of the copending application of William J. Griebstein, Robert J. Grabenstetter and James S. Widder entitled "Oral Compositions for Caries Prophylaxis" Ser. No. 805,853, filed Mar. 10, 1969, now abandoned, which in turn is a continuation-in-part of application Ser. No. 605,614, filed Dec. 29, 1966 now abandoned.

BACKGROUND OF THE INVENTION

By the term "oral composition" as used herein is meant a product which in the ordinary course of usage is not intentionally ingested, but is retained in the oral cavity for a time sufficient to contact substantially all of the dental surfaces. Such products include, for example, dentifrices, mouthwashes, chewing gums, and dental prophylaxis pastes and topical solutions for application in the dental office.

It is known that stannous ions can have a significant effect on the anticariogenic efficacy of oral compositions. For example, a body of scientific literature shows that oral compositions containing stannous ions are substantially more effective in reducing dental caries than similar compositions without stannous ions. [J. C. Muhler et al., J.A.D.A. 51,665 (1955)].

One of the problems which has developed in the formulation of stable oral compositions containing stannous tin, especially aqueous compositions, is the propensity of this metal to oxidize to its higher valence state, hydrolyze to stannous hydroxide and/or react with other constituents of the composition to form very stable complexes or highly insoluble compounds. The occurrence of any of the foregoing can render the tin non-reactive with dental enamel. Stannous tin in this non-reactive state is referred to herein as "unavailable."

Various approaches have been used to maintain stannous tin in dental enamel reactive form. For example, Norris et al., U.S. Pat. 2,946,725, granted July 26, 1960, teach the use of a sparingly soluble stannous salt such as stannous pyrophosphate as a "reservoir" of stannous ion in conjunction with a water-soluble stannous salt. As stannous ion derived from the soluble salt reacts with dental enamel or becomes unavailable through hydrolysis, etc., the sparingly soluble stannous salt slowly dissolves to replace the depleted stannous ion. However, the pyrophosphate anion hydrolyzes to orthophosphate on aging with the result that the "reservoir" capacity of stannous pyrophosphate gradually diminishes.

Holliday et al., U.S. Pat. 3,105,798, granted Oct. 1, 1963, disclose an advance over Norris et al. involving the maintenance of dental enamel reactive stannous tin by complexing Sn(II) ion with an aldonic acid to form a water-soluble stannous aldonate. A similar approach to the preservation of stannous tin in a stable and available form is provided by William J. Griebstein in U.S. Pat. 3,448,132, granted June 3, 1969, which teaches the use of stannous complexes of hydroxyethylnitrilodiacetic acid, meta-hydroxy benzoic acid, 1,2,3-propanetricarboxylic acid, itaconic acid, or malic acid for this purpose. These complexes are characterized in their solubility in aqueous solution and the strength of these complexes is such that stannous tin is protected from inactivating influences, yet is not so strong as to prevent reaction with dental enamel. Thus, the Holliday et al. and Griebstein approach to maintenance of stannous tin represents a compromise between stability and reactivity, with the result that the stannous tin derived therefrom is not as available for reaction of dental enamel as would be the case with a less stable complex.

It has now been found that yet another and more effective approach to the maintenance of reactive stannous tin exists which involves the provision of certain sparingly soluble stannous polyphosphonate salts which slowly dissolve to yield weak stannous complexes. These stannous complexes are more reactive with dental enamel than the prior art soluble complexes, yet the anions are more stable to hydrolysis than the pyrophosphate of Norris et al. which results in greater stability on aging. Thus, the advantages of both prior art approaches to maintenance of stannous tin can be realized in the approach herein provided. Moreover, the stannous complexes formed by the stannous salts of this invention interfere with calcium hydroxylapatite crystal growth and thus retard dental calculus formation in the manner described in the copending application of Homer W. McCune and Nathaniel B. Tucker, Ser. No. 731,312, filed May 22, 1968.

Accordingly, it is an object of this invention to provide improved oral compositions containing stannous compounds which are effective in inhibiting dental caries and calculus.

It is a further object of this invention to provide improved oral compositions which contain stannous tin in a form which resists hydrolysis and conversion to inactive species but which is highly reactive with dental enamel.

These and other objects will become apparent from the following description.

DETAILED DESCRIPTION OF THE INVENTION

This invention is an oral composition for caries and calculus prophylaxis comprising from about 0.05% to about 5.0% by weight of a stannous salt of a polyphosphonic acid of the formulae:

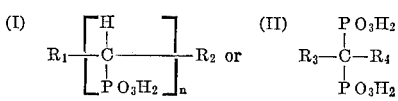

wherein $R_1$ and $R_2$ are each selected from the group consisting of hydrogen and $CH_2OH$; $n$ is an integer of from 3 to 5; $R_3$ is a member selected from the group consisting of hydrogen, halogen (e.g., chlorine, bromine and fluorine), hydroxyl, benzyl, phenylethenyl, aryl (e.g., phenyl and naphthyl), $-CH_2PO_3H_2$, $-CH(PO_3H_2)(OH)$, $-CH_2CH(PO_3H_2)_2$, and alkyl, hydroxyalkyl, methoxyalkyl, carboxyalkyl or alkenyl containing from 1 to 14 carbon atoms, and $R_4$ is a member selected from the group consisting of hydrogen, bromine, fluorine, amino, hydroxyl, phenyl, benzyl,

—CH$_2$PO$_3$H$_2$, —CH$_2$CH$_2$PO$_3$H$_2$ and alkyl, hydroxyalkyl, methoxyalkyl, or carboxyalkyl containing from 1 to 12 carbon atoms, and a carrier suitable for use in the oral cavity, the pH of said composition being in the range from about 2.5 to about 7.

Stannous salts of polyphosphonic acids of the above Formula I which can be used in the compositions of this invention include the following:

Tristannous propane-1,2,3-triphosphonate
Tetrastannous butane-1,2,3,4-tetraphosphonate
Tetrastannous pentane-1-hydroxy-2,3,4,5-tetraphosphonate
Tristannous pentane-1,5-dihydroxy-2,3,4-triphosphonate
Pentastannous pentane-1,2,3,4,5-pentaphosphonate.

Stannous salts of the polyphosphonic acids encompassed by the above Formula II which can be used in the compositions of this invention include the following:

Distannous ethane-1-hydroxy-1,1-diphosphonate
Distannous methanediphosphonate
Tristannous ethane-1,1,2-triphosphonate
Tetrastannous propane-1,1,3,3-tetraphosphonate
Distannous ethane-2-phenyl-1,1-diphosphonate
Distannous methanephenylhydroxydiphosphonate
Distannous methanehydroxydiphosphonate
Distannous ethane-2-naphthyl-1,1-diphosphonate
Distannous methanephenyldiphosphonate
Distannous nonane-5,5-diphosphonate
Distannous n-pentane-1,1-diphosphonate
Distannous methanedifluorodiphosphonate
Distannous methanedibromodiphosphonate
Distannous methaneaminodiphosphonate
Distannous propane-2,2-diphosphonate
Distannous ethane-2-carboxy-1,1-diphosphonate
Tristannous propane-1-hydroxy-1,1,3-triphosphonate
Tristannous ethane-1-hydroxy-1,1,2-triphosphonate
Tristannous ethane-2-hydroxy-1,1,2-triphosphonate
Distannous propane-1,3-diphenyl-2,2-diphosphonate
Distannous butane-1,1-diphosphonate
Distannous nonane-1,1-diphosphonate
Distannous pent-4-ene-1-hydroxy-1,1-diphosphonate
Distannous octadec-9-ene-1-hydroxy-1,1-diphosphonate
Distannous 3-phenyl-1,1-diphosphono-prop-2-ene
Distannous octane-1,1-diphosphonate
Distannous decane-1,1-diphosphonate
Distannous dodecane-1,1-diphosphonate
Distannous dodecane-2,2-diphosphonate The foregoing stannous polyphosphonates are prepared for example by reacting aqueous solutions of the corresponding acid with a quantity of SnCl$_2$ sufficient to provide a mole ratio of stannous tin to polyphosphonic acid of from 2:1 to 5:1, depending on the number of phosphonic acid groups in the compound. The preparation of representative stannous polyphosphonates which can be used in the oral compositions of this invention is fully disclosed in the application of Griebstein et al., entitled "Stannous Salts of Polyphosphonic Acids," filed concurrently herewith which is incorporated herein by reference.

Although any of the stannous salts of the polyphosphonic acids encompassed by the foregoing formulae can be used in the practice of this invention, distannous methanediphosphonate, distannous methanehydroxydiphosphonate, tristannous propane-1,2,3-triphosphonate, distannous methanedibromodiphosphonate, and distannous ethane-1-hydroxy-1,1-diphosphonate are especially preferred.

The stannous polyphosphonates can comprise from about 0.5% to about 5.0% by weight of the compositions of this invention. Less than about .05% is not sufficient to provide effective levels of reactive stannous tin throughout the usual shelf-life of the product. More than about 5.0% of this component will produce an astringent taste and cause flavoring problems. Preferably, the stannous polyphosphonates are used in a concentration within the range from about 0.1% to about 1.0% by weight.

Preferably, soluble stannous salts such as stannous chloride, are employed in the oral compositions of this invention as an additional source of stannous tin, in a quantity sufficient to provide at least 300 p.p.m. of stannous tin. However, all of the stannous tin contained in these compositions can be derived from the stannous polyphosphonates. In any event, the total stannous tin content can be from about 15 to about 10,000 p.p.m., the preferred range being from about 50 to about 8,000 p.p.m.

It will be apparent to those skilled in the art that oral compositions in accordance with this invention can also be prepared by adding a polyphosphonic acid as characterized herein and a water-soluble stannous salt such as stannous chloride to the oral composition and thereby form the corresponding stannous polyphosphonate in situ to obtain the benefits of this invention.

The pH of the compositions of this invention lies between about 2.5 and 7, the preferred range being from about 4.0 to 6.5. Above about pH 7 loss of stannous ions available for reaction with enamel can be too rapid; and, certain flavoring substances, especially esters, deteriorate rapidly. Too low at pH, below about 2.5, produces an astringent taste which is highly objectionable to most people. It also accelerates the hydrolysis of certain of the sudsing agents thereby producing an upleasant "fatty acid taste" and reducing the amount of sudsing obtained in use. Furthermore, pH values below 2.5 tend to cause corrosion of metal tubes in which the composition may be stored, and tend to hydrolyze other ingredients such as condensed phosphates if used as abrasives. Such hydrolysis can decrease the availability of stannous ions by providing anions with which they can form very stable complexes or with which they can precipitate as highly insoluble compounds.

In addition to the stannous polyphosphonates, the compositions of this invention can contain the usual dentifrice, mouthwash, etc., components. For example, toothpastes typically contain an abrasive material, sudsing agent, binders, humectants, flavoring and sweetening materials.

The abrasives preferably should be relatively insoluble and stable at the pH ranges herein specified. They desirably should not be so abrasive as to scratch the surface of the teeth or unduly abrade the dentin, but they desirably should have just sufficient abrading power to clean the teeth. In the practice of this invention, any dental abrasives can be used which have these abrasion properties, and are sufficiently compatible with stannous ion.

Preferred abrasives for use in the dentifrices of this invention include the insoluble condensed phosphates and the water-impervious, cross-linked, thermosetting resins. Examples of such insolube condensed phosphates include calcium pyrophosphate, insoluble highly polymerized calcium polyphosphate—sometimes called calcium polymethaphosphate, and insoluble highly polymerized sodium polyphosphate—sometimes called insoluble sodium metaphosphate. Examples of operable resin abrasives are the particulate condensation products of formaldehyde with melamine and/or urea, and others fully described in U.S. Pat. 3,070,510, granted Dec. 25, 1962. Mixtures of abrasives can be used.

The total amount of abrasive materials in dentifrices of this invention can range from 0.5% to 95% by weight of the dentifrice. Preferably, toothpastes contain from 20% to 60% by weight, and toothpowders contain from 60% to 95% by weight.

Dentifrices conventionally contain sudsing agents, although these are not critical in the practice of the present invention. Any of the commonly used sudsing agents can be used if they are reasonably stable and form suds within the pH range of the compositions of this invention. Examples of suitable sudsing agents include, but are not limited to, water-soluble salts of alkyl sulfates having from about 10 to 18 carbon atoms in the allyl group such as sodium lauryl sulfate; water soluble salts of sulfonated monoglycerides of fatty acids having from about 10 to 18 carbon atoms, such as sodium coconut monoglyceride sulfonate; salts of fatty acid amides of taurines, such as sodium-N-methyl-N-palmitoyl tauride; salts of fatty acid esters of isothionic acid and substantially saturated aliphatic acyl amides of saturated aliphatic monoaminocarboxylic acids having 2 to 6 carbon atoms and in which the acyl radical contains 12 to 16 carbon atoms, such as sodium N-lauroyl sarcoside. Mixtures of two or more sudsing agents can also be used.

Sudsing agents can be used in the compositions of this invention in an amount of from 0.5% to 5.0% by weight of the total composition.

In preparing toothpastes, it is necessary to add some thickening material. Preferred thickening agents are water-soluble salts of cellulose ethers such as sodium carboxymethyl cellulose and sodium carboxymethyl hydroxyethyl cellulose. Natural gums such as gum karaya, gum arabic, and gum tragacanth also can be used as thickeners, but may tend to cause undesirable odors or flavors in some formulations. Colloidal magnesium aluminum silicate or finely divided silica can be used as a part of the thickening agent for improvement in texture. Thickening agents in an amount of from 0.5% to 5.0% by weight of toothpaste, can be used to form a satisfactory toothpaste.

Suitable humectants include glycerine, sorbitol, and other polyhydric alcohols. The humectants may comprise up to about 35% of the toothpaste composition.

Oral compositions additionally contain small amounts of flavoring, such as oil of wintergreen, oil of peppermint, oil of spearmint, oil of sassafras, and oil of anise. Small amounts of sweetening agents such as saccharin, dextrose, levulose, and sodium cyclamate are also conventionally added to such compositions.

Each of the oral composition ingredients recited in the foregoing disclosure, except the stannous salts, exemplify carriers suitable for use in the oral cavity.

Several toothpaste embodiments of this invention are prepared using conventional mixing methods, and tested for stannous tin stability and availability for reaction with dental enamel and anticalculus efficacy.

The stability of the toothpastes on aging with respect to supplying enamel reactive stannous tin is measured by an accelerated aging test conducted in the following manner:

A test sample is incubated at room temperature of 50° C. and after specified intervals of time, soluble stannous tin concentration is determined by mixing 1 part of the toothpaste with three parts of distilled water for 10 minutes. The solids are then removed by centrifugation for 30 minutes at 12,000 r.p.m. and the stannous tin concentration is an aliquot of the supernatant is determined iodometrically. A second portion of the test sample is then adjusted to and held at a pH near neutrality, mixed with water (1 part paste to 3 parts water) for 1 hour, centrifuged as above, and a second analysis for stannous tin is undertaken. Since raising the pH to this level results in the solution of substantially all of the undissolved portion of the stannous salt, the second value provides a measure of the "reservoir" effect of these salts. The results are reported as parts per million of soluble stannous tin.

The anticaries potential of the oral compositions of this invention is measured by the "ESR Test" (enamel solubility reduction). The purpose of this test is to determine chemically the reduction of solubility of dental enamel by treatment with a solution or dentifrice slurry.

The test is run on sound human teeth, usually molars, cuspids and bicuspids. The teeth are cleaned and polished and the roots are then cut off about ¼" below the lowest point of the enamel. Any part of a tooth which appears damaged is covered with blue inlay casting wax. The teeth are mounted in 180 ml. tall form beakers, the bottoms of which have been coated with blue inlay casting wax. The teeth are mounted in dental cement so that only intact dental enamel is exposed.

Test runs are made on four beakers of six teeth each. The teeth are prepared by putting about 100 ml. of 0.1 N lactic acid (lactate) buffer at pH 4.5 in the tooth set beaker and stirring the solution with a constant speed (1725 r.p.m.) motor, for two one-hour periods, renewing the buffer for each one-hour period.

The test is run with the tooth mounts immersed about one-half their length in a constant temperature water bath at 37° C. The prepared tooth sets are set in clamps which maintain them at this height in the bath. The constant speed motors are lowered so that the stirring propeller is about ½" above the teeth in the beaker, maintaining the propeller at this height throughout the test. A 40 ml. aliquot of lactate buffer is added to the mounted tooth set and the stirrer is started. After 15 minutes, the lactate buffer is removed, saved for analysis, and the tooth mounts are rinsed three times in distilled water and replaced in the water bath for the treatment step.

A 15 gram portion of the test dentifrice is mixed with about 45 ml. of water and this mixture is centrifuged for 15 minutes. A 40 ml. aliquot of the supernatant from the centrifuged dentifrice slurry is added to the tooth set and the stirrer is started. At the end of five minutes of treatment, the stirring is stopped and the treatment solution is discarded. The teeth are rinsed in distilled water and exposed to another 40 ml. of lactate buffer stirred at 1725 r.p.m. for 15 minutes. This post-treatment lactate solution and the pre-treatment lactate solution are analyzed for phosphorus using the method of Martin and Doty. The percentage of enamel solubility reduction is computed as the difference between the amount of phosphorus in the pre-treatment and post-treatment lactate buffer solutions divided by the amount of phosphorus in the pre-treatment lactate buffer solution.

Formulations of various toothpastes of this invention are set forth in Table 1 below. The numbers set forth in Table 1 refer to concentration in parts by weight.

TABLE 1

| | Liquids | | | Abrasives | | | Polyphosphonate | |
|---|---|---|---|---|---|---|---|---|
| | $H_2O$ | Sorbo [1] | Glycerine | $Ca_2P_2O_7$ | MUF [2] | UF [3] | $Sn_2EHDP$ [4] | $Sn_2MDP$ [5] |
| Example: | | | | | | | | |
| I | 25.7 | 19.6 | 9.8 | | 14.7 | 22.5 | | 0.98 |
| II | 26.19 | 19.6 | 9.8 | | 14.7 | 22.5 | | 0.49 |
| III | 26.44 | 19.6 | 9.8 | | 14.7 | 22.5 | | 0.245 |
| IV | 23.4 | 21.6 | 10.8 | | 14.9 | 22.3 | | 0.49 |
| V | 22.83 | 21.6 | 10.8 | | 14.9 | 22.3 | | 0.25 |
| VI | 25.5 | 19.38 | 9.69 | 37.8 | | | | 0.48 |
| VII | 26.37 | 19.38 | 9.69 | 37.8 | | | | 0.24 |
| VIII | 26.13 | 19.38 | 9.69 | 37.8 | | | 0.48 | |
| IX | 25.04 | 20.0 | 10.0 | | 15.0 | 23.0 | | 0.1 |
| X | 25.01 | 20.0 | 10.0 | | 15.0 | 23.0 | | 0.25 |
| XI | 21.88 | 22.0 | 11.0 | | 15.2 | 22.8 | | 0.1 |
| XII | 25.43 | 20.0 | 10.0 | | 15.0 | 23.0 | | 0.1 |
| XIII | 26.30 | 19.4 | 9.7 | 37.83 | | | 0.24 | |
| XIV | 26.06 | 19.4 | 9.7 | 37.83 | | | 0.48 | |
| XV | 26.17 | 19.4 | 9.7 | 37.83 | | | | 0.375 |
| XVI | 26.17 | 19.4 | 9.7 | 37.83 | | | 0.375 | |
| XVII | 26.37 | 19.4 | 9.7 | 37.83 | | | | 0.17 |

Footnotes at end of table.

TABLE 1.—Continued

| | SnCl$_2$ | Sweetner | Sudser | | Thickener | | | Miscellaneous, color and Flavor |
| --- | --- | --- | --- | --- | --- | --- | --- | --- |
| | | | SAS [6] | MgSO [7] | CMC [8] | V-gum [9] | HEC [10] | |
| Example: | | | | | | | | |
| I | 0.39 | 0.27 | 2.38 | 0.79 | 1.03 | 0.39 | | 1.47 |
| II | 0.39 | 0.27 | 2.38 | 0.79 | 1.03 | 0.39 | | 1.47 |
| III | 0.39 | 0.27 | 2.38 | 0.79 | 1.03 | 0.39 | | 1.47 |
| IV | 0.49 | 0.47 | 3.43 | | | | 1.37 | 1.56 |
| V | 0.49 | 0.47 | 3.43 | | | | 1.37 | 1.56 |
| VI | 0.39 | 0.14 | 2.35 | 0.78 | 1.02 | 0.39 | | 1.45 |
| VII | 0.39 | 0.14 | 2.35 | 0.78 | 1.02 | 0.39 | | 1.45 |
| VIII | 0.39 | 0.14 | 2.35 | 0.78 | 1.02 | 0.39 | | 1.45 |
| IX | 0.4 | 0.27 | 2.43 | 0.81 | 1.05 | 0.4 | | 1.5 |
| X | | 0.27 | 2.43 | 0.81 | 1.05 | 0.4 | | 1.5 |
| XI | 0.5 | 0.48 | 3.50 | | | | 1.40 | 1.14 |
| XII | | 0.27 | 2.43 | 0.81 | 1.05 | 0.4 | | 1.5 |
| XIII | 0.39 | 0.14 | 2.36 | 0.78 | 1.02 | 0.39 | | 1.45 |
| XIV | 0.39 | 0.14 | 2.36 | 0.78 | 1.02 | 0.39 | | 1.45 |
| XV | 0.39 | 0.14 | 2.36 | 0.78 | 1.02 | 0.39 | | 1.45 |
| XVI | 0.39 | 0.14 | 2.36 | 0.78 | 1.02 | 0.39 | | 1.45 |
| XVII | 0.39 | 0.14 | 2.36 | 0.78 | 1.02 | 0.39 | | 1.45 |

[1] Sorbitol, 30% aqueous solution.
[2] Precipitated melamine-urea-formaldehyde condensation product.
[3] Precipitated urea-formaldehyde condensation product.
[4] Distannous ethane-1-hydroxy-1,1-diphosphonate.
[5] Distannous methanediphosphonate.
[6] Sodium lauryl sulfate.
[7] Sodium coconut monoglyceride sulfonate.
[8] Sodium carboxymethylcellulose.
[9] Magnesium aluminum silicate.
[10] Hydroxyethylcellulose.

The toothpastes of the foregoing examples provide a relatively constant level of Sn(II) after aging even under severe storage conditions for long periods (28 days). The ESR values for several of the examples are substantial even after this period of aging. Substantial reductions in the formation of dental calculus are observed in individuals using the toothpastes of the foregoing examples as compared to those using a control toothpaste without a stannous polyphosphonate.

Several additional toothpastes are prepared, each containing one of the following stannous polyphosphonates in place of Sn$_2$MDP, but otherwise conforming to the composition of Example VI:

Distannous methanedibromodiphosphonate
Tristannous propane-1,2,3-triphosphonate
Tetrastannous butane-1,2,3,4-tetraphosphonate
Pentastannous pentane-1,2,3,4,5-pentaphosphonate
Tristannous pentane-1,5-dihydroxy-2,3,4-triphosphonate
Tristannous ethane-1,1,2-triphosphonate
Tetrastannous propane-1,1,3,3-tetraphosphonate
Distannous ethane-1-amino-1,1-diphosphonate
Tristannous propane-1-hydroxy-1,1,3-triphosphonate
Distannous methanedibromodiphosphonate When tested in the manner described above, each of these toothpastes display excellent stability and anticalculus properties.

Other oral compositions in accordance with this invention are formulated as follows:

EXAMPLE XVIII

A mouthwash composition is prepared by mixing the following components using conventional means.

| Component: | Percent by weight |
| --- | --- |
| Ethyl alcohol (50% ethanol, 50% water) | 85.88 |
| Glycerine | 12.00 |
| Distannous ethane-1-hydroxy-1,1-diphosphonate | 1.15 |
| Flavoring | 0.85 |
| Saccharin | 0.12 | pH adjusted to 6.5.

Prior to use this composition is diluted by adding 2 ml. of the concentrate to 20 ml. of water. This composition contains high levels of dental enamel reactive Sn(II) over substantial periods of time and yields a substantial reduction in enamel solubility and calculus formation, even after aging.

The distannous ethane-1-hydroxy-1,1-diphosphonate of this example can be replaced by distannous propane-2,2-diphosphonate, distannous methanehydroxydiphosphonate, or distannous methanephenylhydroxydiphosphonate in quantities sufficient to provide equivalent Sn(II) levels with good results.

Additional mouthwash compositions are prepared, each conforming to the formulation of Example XVIII but replacing the distannous ethane-1-hydroxy-1,1-diphosphonate with the following stannous polyphosphonates:

Distannous octadec-9-ene-1-hydroxy-1,1-diphosphate
Distannous 3-phenyl-1,1-diphosphonoprop-2-ene
Distannous methanediphosphonate
Distannous ethanediphosphonate
Distannous ethane-2-naphthyl-1,1-diphosphonate
Distannous methanehydroxydiphosphonate
Distannous aminomethanediphosphonate These compositions display stannous stability and anticalculus properties comparable to those of the mouthwash of Example XVIII.

EXAMPLE XIX

Another mouthwash embodiment of the invention is formulated as follows:

| Component: | Percent by weight |
| --- | --- |
| Ethanol | 35.72 |
| Glycerine | 10.00 |
| Stannous chloride | 0.016 |
| Distannous methanediphosphonate | 0.15 |
| Flavoring | 0.16 |
| Saccharin | 0.12 |
| Water | Balance | pH adjusted to 6.0.

This mouthwash contains effective concentrations of enamel-reactive stannous tin over a period of several months. When used in the conventional manner in undiluted form this composition substantially reduces dental calculus formation and enamel solubility.

Distannous nonane-5,5-diphosphonate, distannous decane-1,1-diphosphonate, distannous dodecane-2,2-diphosphonate, distannous tetradecane-3,3-diphosphonate, or distannous butane-1,1-diphosphonate can be used in place of distannous methane diphosphonate with comparable results.

EXAMPLE XX

A chewing gum is prepared having the following composition.

| Component: | Percent by weight |
|---|---|
| Gum base [1] | 21.75 |
| Sugar | 59.50 |
| Corn Syrup (Baumé 45) | 18.20 |
| Flavoring | q.s. |
| Distannous pentadecane-8,8-diphosphonate | 0.55 |

Adjust to pH 4.5.

[1] See the following table:

| | Parts |
|---|---|
| Estergum | 30 |
| Coumarone resin | 45 |
| Latex (dry) | 15 |
| Paraffin wax (M.P. 180° F.) | 10 |

This composition provides an effective means for caries and calculus prophylaxis when chewed in the conventional fashion. Sufficient stannous ion is ionized in the course of chewing in saliva to reduce the solubility of dental enamel.

This composition retains high levels of active Sn(II) even after prolonged storage.

The distannous pentadecane-8,8-diphosphonate used in this composition can be replaced by distannous ethane-2-hydroxy-1,1-diphosphonate, distannous decane-1-hydroxy-1,1-diphosphonate, distannous methanebenzyldiphosphonate, distannous ethane-1-methoxy-1,1-diphosphonate or distannous methoxymethylenediphosphonate with no substantial loss of stability or efficacy.

The distannous gem-diphosphonates employed in each of the foregoing examples can also be replaced with distannous ethane-1-acetyl-1,1-diphosphonate or propane-1,3-diphenyl-2,2-diphosphonic acid with good results.

What is claimed is:

1. An oral composition for caries and calculus prophylaxis comprising from about 0.05% to about 5.0% by weight of a stannous salt of a polyphosphonic acid having the formula:

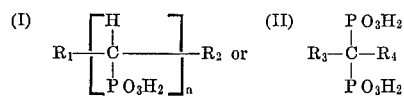

wherein $R_1$ and $R_2$ are each selected from the group consisting of hydrogen and $CH_2OH$; $n$ is an integer of from 3 to 5; $R_3$ is a member selected from the group consisting of hydrogen, halogen, hydroxyl, benzyl, phenylethenyl, phenyl, naphthyl, $—CH_2PO_3H_2$, $—CH(PO_3H_2)(OH)$, $—CH_2CH(PO_3H_2)_2$, and alkyl, hydroxyalkyl, methoxyalkyl, carboxyalkyl or alkenyl containing from 1 to 14 carbon atoms, and $R_4$ is a member selected from the group consisting of hydrogen, bromine, fluorine, amino, hydroxyl, phenyl, benzyl, $—CH_2PO_3H_2$, $—CH_2CH_2PO_3H_2$, and alkyl, hydroxyalkyl, methoxyalkyl, or carboxyalkyl containing from 1 to 12 carbon atoms, and a carrier suitable for use in the oral cavity, the pH of said composition being in the range from about 2.5 to about 7.

2. The composition of claim 1 wherein the stannous salt is distannous methanediphosphonate.

3. The composition of claim 1 wherein the stannous salt is distannous ethane-1-hydroxy-1,1-diphosphonate.

References Cited

UNITED STATES PATENTS

| | | | |
|---|---|---|---|
| 3,105,798 | 10/1963 | Holliday et al. | 424—52 |
| 3,227,707 | 1/1966 | Langer | 424—52 |
| 3,277,132 | 10/1966 | Wild et al. | 424—51 |
| 3,317,395 | 5/1967 | Edwards | 424—49 |
| 3,358,007 | 12/1967 | Langer | 424—52 |
| 3,448,132 | 6/1969 | Griebstein | 424—49 |
| 3,471,552 | 10/1967 | Budnick | 260—429.7 |

RICHARD L. HUFF, Primary Examiner